United States Patent
Korhonen

(10) Patent No.: US 10,122,606 B1
(45) Date of Patent: Nov. 6, 2018

(54) SYSTEM AND METHOD FOR ESTIMATING AN AMOUNT OF ACKNOWLEDGED APPLICATION DATA TRANSMITTED BY ENCRYPTED TRANSPORT

(71) Applicant: NetScout Systems, Inc, Westford, MA (US)

(72) Inventor: Mark Korhonen, Breslau (CA)

(73) Assignee: NetScout Systems, Inc., Westford, MA (US)

( * ) Notice: Subject to any disclaimer, the term of this patent is extended or adjusted under 35 U.S.C. 154(b) by 56 days.

(21) Appl. No.: 15/586,850

(22) Filed: May 4, 2017

(51) Int. Cl.
*H04L 12/26* (2006.01)

(52) U.S. Cl.
CPC .......... *H04L 43/0894* (2013.01); *H04L 43/12* (2013.01)

(58) Field of Classification Search
CPC .............................. H04L 43/0894; H04L 43/12
See application file for complete search history.

(56) References Cited

U.S. PATENT DOCUMENTS

| 8,024,471 | B2 * | 9/2011 | Sinclair | G06F 17/3089 370/241 |
| 2018/0123803 | A1 * | 5/2018 | Park | H04L 9/14 |

* cited by examiner

*Primary Examiner* — Andrew Lai
*Assistant Examiner* — Harry H Kim
(74) *Attorney, Agent, or Firm* — Locke Lord LLP; Scott D. Wofsy; Christopher J. Capelli

(57) ABSTRACT

A system and computer-implemented method to process bidirectional network traffic having encrypted application data and using an encrypted transport protocol. The method includes estimating a size of encrypted application data in respective packets of the bidirectional network traffic, wherein the packets of the bidirectional network traffic are transported in opposing directions. The method further includes assigning timing criteria to respective application packets transported in the opposing directions that were determined to include a threshold amount of encrypted application data, the timing criteria being based on a time of observation at an observation point of the corresponding application packet, and acknowledging, for respective packets of the application packets, selected application packets that were selected based on the timing criteria assigned to the respective application packets. The method further includes estimating an amount of encrypted application data transported in at least one of the opposing directions based on a sum of the estimated size of the encrypted application data in the respective acknowledged packets transported in the at least one of the opposing directions that were observed during a selected time interval.

25 Claims, 11 Drawing Sheets

SYSTEM AND METHOD FOR ESTIMATING AN AMOUNT OF ACKNOWLEDGED APPLICATION DATA TRANSMITTED BY ENCRYPTED TRANSPORT

FIELD OF THE INVENTION

The present technology relates to network monitoring and, more particularly, methods and systems to estimate an amount of acknowledged application data transmitted by an encrypted transport protocol.

BACKGROUND OF THE INVENTION

Network analysis systems analyze data about the amount of application data that has been acknowledged by end points in a network flow. When network traffic is transported using an unencrypted transport protocol, such as transmission control protocol (TCP), information in the packet headers can indicate the amount of application data that has been acknowledged by the end points. For example, information stored in the SEQ and ACK packet headers can provide such information. However, when network traffic is transported using an encrypted transport protocol, without decryption of the packet headers, such information is inaccessible. In many scenarios, decryption is not an option.

Such conventional methods and systems have generally been considered satisfactory for their intended purpose. However, there is still a need in the art for estimation of an amount of acknowledgement application data when an encrypted transport protocol is used.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer implemented method to process bidirectional network traffic having encrypted application data and using an encrypted transport protocol. The method includes estimating a size of encrypted application data in respective packets of the bidirectional network traffic, wherein the packets of the bidirectional network traffic are transported in opposing directions. The method further includes assigning timing criteria to respective application packets transported in the opposing directions that were determined to include a threshold amount of encrypted application data. The timing criteria are based on a time of observation at an observation point of the corresponding application packet. The method further includes acknowledging, for respective packets of the application packets, selected application packets that were selected based on the timing criteria assigned to the respective application packets, and estimating an amount of encrypted application data transported in at least one of the opposing directions based on a sum of the estimated size of the encrypted application data in the respective acknowledged packets transported in the at least one of the opposing directions that were observed during a selected time interval.

In accordance with another aspect of the disclosure, a system is provided to process bidirectional network traffic having encrypted application data and using an encrypted transport protocol. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
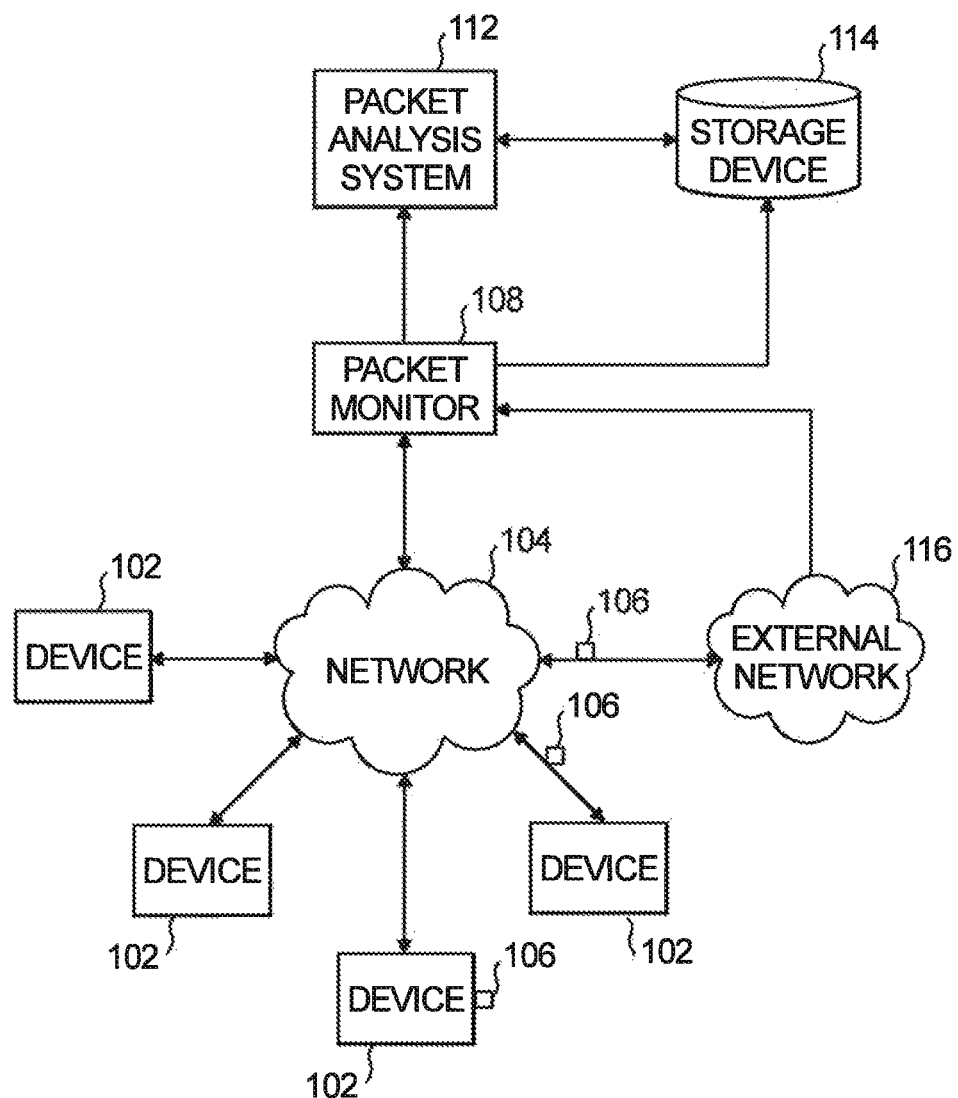
FIG. 1 illustrates an example network analytics system in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a network analytics system in accordance with the disclosure is shown in FIG. 1 and is designated generally by reference character 100. Other embodiments of the network analytics system 100 in accordance with the disclosure, or aspects thereof, are provided in FIGS. 2-11, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a plurality of devices 102 which are coupled to a network 104. The devices 102 can communicate with other devices 102 that are coupled to the same network or a different network via the network 104. The network 104 can be, for example, a network such as the Internet, a private network, a different public network, a cellular network, a personal communication service (PCS) network, a public switched telephone network (PSTN), a wired network, a wireless network, etc. Network traffic can be between devices of the network 104 and or between devices of the network 104 and devices of an external network 116 via network 104.

The devices 102 can communicate with the network 104 and/or another device 102 via one or more communication links. These communication links can be wireless, wired, or a combination thereof. The devices 102 can include, for example, mobile computing devices, smart phones, servers, media servers, stationary computing devices, printers or multi-functions devices, sensors, and network devices, such as routers, switches, hubs, and bridges that are used to communicatively couple host devices 102 to one another.

The packet monitor 108 can be positioned inline with all or a portion of network traffic flowing to and from network 104. Additionally, packet intercept devices 106 can be distributed about the network 104 to intercept packets flowing at various locations of the network 104, including disposed at locations along communication links coupled to the network 104 and/or disposed at or integrated with devices 102 coupled to the network 104.

Packet intercept devices 106 can intercept and/or make copies of packets of the network traffic. The packet intercept devices 106 can be passive or active and include software, firmware, and/or hardware components, such as taps, probes, or port mirrors that can be positioned inline along communication links between any devices 102 or integrated with devices 102. In embodiments, the packet intercept devices 106 can include software modules, which can include software agents, or can be virtual devices that are remote relative to devices 102 and the communication links.

The packets intercepted by the packet intercept devices 106 can be collected by the packet monitor 108, which can provide the packets, or create packet summaries and provide the packet summaries, to a storage device 114 and/or to a packet analysis system 112. Providing the packets or packet summaries can include storing the data such that it can be accessed, or transmitting the data.

The packet monitor 108 and/or the intercept devices 106 can be located remotely from the packet analysis system 112. Alternatively, the packet monitor 108 can be co-located with, or embodied in, the packet analysis system 112.

The packet monitor 108 may be a special purpose computing device or a software component (not limited to a single process) dedicated to monitoring data communicated via the network 104. Alternatively, the packet monitor 108 may be a general purpose computing device with specialized software components installed thereon. In one example embodiment, the packet monitor 108 is embodied as nGenius Collectors, nGenius Probes, nGenius InfiniStream, or nGenius InfiniStreamNG available from NetScout Systems, Inc. of Westford, Mass.

The packet analysis system 112 includes hardware, software, firmware or a combination thereof for estimating an amount of acknowledged application data transmitted by encrypted transport between end points of a traffic flow through network 104. The packet analysis system 112 may be embodied as a general purpose computing device installed with specialized software for performing one or more of these operations. Alternatively, the packet analysis system 112 is embodied as a specialized computing device. In one example embodiment, the packet analysis system 112 is a computing device running Netscout nGenius ONE, available from NetScout Systems, Inc. of Westford, Mass.

Figure 2:
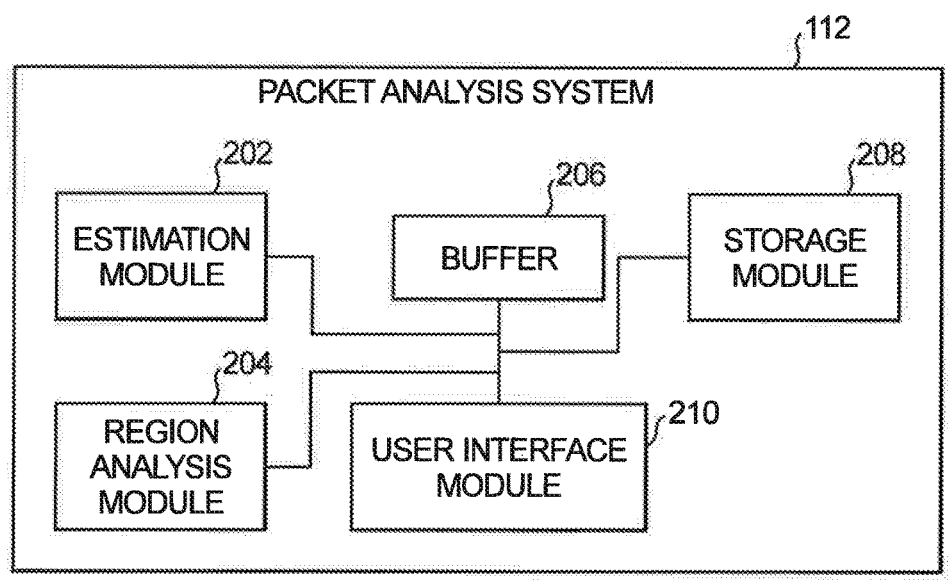
FIG. 2 illustrates an example packet analysis system of the network analytics system shown in FIG. 1.

With reference to FIG. 2, a block diagram of the packet analysis system 112 is shown. The packet analysis system includes an estimation module 202, a region analysis module 204, a buffer 206, a storage module 208, and a user interface (UI) module 210. The estimation module 202 and region analysis module 204 process packets included in bidirectional network traffic of a network, such as network 104.

The estimation module 202 processes the observed packets of the network traffic, including to estimate a size (e.g., number of application data bytes) of encrypted application data in respective packets of the bidirectional network traffic transported in opposing directions.

In embodiments, in an example method of estimating the size of the encrypted application data in an encrypted packet, it is assumed that packets having fewer than M bytes of payload, for a predetermined threshold M, contain only acknowledgements and do not include any application data bytes. For the remaining packets that have at least M bytes of payload, the number of application data bytes is estimated using the number of payload bytes in the packet. For example, the number of application data bytes of a remaining packet can be estimated to be a length (e.g., number of bytes) of the remaining packet's payload minus an estimated size of an encrypted transport header (and footer, if applicable) of the packet.

The estimation module 202 can further estimate whether or not a packet is an application packet or an acknowledgment packet based at least on an amount of application data estimated to be included in the packet. An application packet includes payload data being transmitted on behalf of an application. Application packets, in addition to including payload data may (optionally) also include acknowledge application packets sent from the opposite direction.

An application packet may also include encrypted negotiation parameters (analogous to TLS handshake records). An example can be illustrated based on Quick UDP Internet Connections (QUIC), a transport layer network protocol that supports a set of multiplexed connections between two endpoints over User Datagram Protocol (UDP). In the example, a QUIC flow's application data includes a) the QUIC handshake packets (e.g., CHLO, REJ, version negotiation, etc., some of which can be unencrypted) as well as HTTP/2 payload (e.g., HTTP/2 frames, such as HEADER, DATA, SETTINGS, GOAWAY, etc.).

An acknowledgement packet, which does not include payload data, acknowledges receipt of application packets.

However, under some conditions, the size of acknowledgement packets can vary with time such that an acknowledgment packet can be the same size (or larger) than application packets that contain application data. For example, the size of an acknowledgment packet that functions to acknowledge receipt of received data can grow, such as due to the inclusion of retransmitted application data. For example, when algorithms such as selective acknowledgement (SACK) are used, acknowledgement packets can grow in size as range(s) of selected acknowledgement increase and a consequential amount of dropped packets included in the acknowledgment packets increases.

Additionally, the estimation module 202 can take into consideration that programs can be used to reduce the number of retransmitted packets. For example, QUIC, may use forward error correction to reduce the number of retransmitted packets. Thus, in embodiments, when determining whether a packet is an application packet or an acknowledgment packet, the estimation module 202 can take into account relative timing of packets and/or detection of a condition that causes the size of acknowledgement packets to increase.

Furthermore, using a mechanism known as "tail loss probe," QUIC sometimes intentionally retransmits a packet before the destination end would have had a chance to acknowledge it. In embodiments, the estimation module 202 can detect a tail loss probe condition using relative timing of packets.

The estimation module 202 further assigns timing criteria to respective application packets and acknowledges application packets based on their timing criteria. The timing criteria can include an earliest acknowledgement time, which can be an earliest possible time at which the corresponding application packet can be acknowledged, and/or a timeout period that expires a predetermined time period measured from an observation time of the corresponding application packet.

The earliest acknowledgement time assigned to a packet can be selected to be a time spaced by an offset from the time the packet was observed, wherein the offset is a configurable, constant time interval. In embodiments, the offset can be an adaptive time offset that varies based on another factor, such as wherein the offset is a function of the corresponding application packet's round trip time (RTT)). For example, a client-side or server-side RTT estimate could be used in conjunction with a configurable constant offset. An example description of a method of determining RTT estimates is provided at Kharazzi et al., Towards Real-Time Performance Monitoring for Encrypted Traffic, ACM INM '07, 27-31, Aug. 2007, http://sharif.edu/~kharrazi/pubs/inm07.pdf, without limiting the disclosure to this particular method.

Regarding the timeout period, the timeout period for respective acknowledgment packets can be measured using one or more timeout timers to treat an application packet as acknowledged after a timeout as long as one acknowledgment packet has been observed after the earliest acknowledgement time of that application packet.

In embodiments, a timeout timer can be associated with each application packet. The timeout timer can be activated for an application packet a predetermined interval (e.g., ACKNOWLEDGMENT_TIMEOUT_SECONDS seconds) after observing the application packet. The timeout timer expires after a timeout period ends.

In embodiments, a single timeout timer can be used for a group of packets or for all of the packets being monitored. For example, a latest ACK time can be set to ACKNOWL-EDGMENT_TIMEOUT_SECONDS seconds after observing an application packet, wherein the latest ACK time is recorded in a list of latest ACK times for unacknowledged packets. If the timeout timer is not active, the timeout timer is assigned to fire at the latest ACK time associated with an observed packet.

In addition, the estimation module 202 acknowledges selected application packets of the application packets based on the timing criteria assigned to the respective application packets. In an example method of acknowledging selected application packets, the estimation module 202 treats each application packet as unacknowledged until it is acknowledged.

As indicated previously, the network is bidirectional, with packets being transported in opposing first and second directions. The packets transported in the first and second directions can be client and server packets, respectively, or server and client packets, respectively. The estimation module 202 iteratively or simultaneously selects a next packet of the bidirectional network traffic to be a selected acknowledgement packet to use for acknowledging one or more application packets that are still treated as unacknowledged and that are transported in an opposing direction as the direction of the selected acknowledgment packet. The acknowledgement packets selected for the respective iterations or simultaneous passes can be transported in either of the first and second opposing directions. In an example, the selected acknowledgement packet is transported in the second direction and is used to acknowledge up to a predetermined maximum number of application packets transported in the first direction.

In other words, when seeking to acknowledge application packets transported in the first direction, each packet transported in the second direction is treated as an acknowledgement packet that can be used to acknowledge up to a maximum number of application packets transported in the first direction. By iterative or simultaneous passes through a process of the method, one acknowledgement packet is selected that is transported in the second direction.

The example method of acknowledging selected application packets is illustrated as Algorithm (1):

Algorithm (1):

a. store the observation time associated with the selected acknowledgement packet;

b. acknowledge (by estimation) all unacknowledged application packets that occurred over ACKNOWLEDGMENT_TIMEOUT_SECONDS seconds ago;

c. if there are no unacknowledged application packets, do nothing, as when the current packet is an application packet, it is common for there to be no unacknowledged application packets, or alternatively the selected acknowledgment packet was redundant relative to previously selected acknowledgment packets, or one or more application packets were falsely reported as being acknowledged before they were actually acknowledged;

d. if the oldest unacknowledged application packet's earliest acknowledgement time has already elapsed, acknowledge (by estimation) this application packet (this acknowledgment being an estimate that this packet was actually acknowledged);

e. if a predetermined maximum number of oldest unacknowledged application packets that can be acknowledged using one acknowledgment packet is one or more, then estimate how many additional application packets and associated data bytes can also be acknowledged (by estimation), such as by this example method:

i. if, after the oldest unacknowledged application packet was acknowledged (by estimation), each of the following two conditions is true, then acknowledge (by estimation) up to the predetermined maximum number of oldest application packets:
1. the application packet's earliest acknowledge time elapsed; and
2. the application packet was observed less than a predetermined DELAYED_ACKNOWLEDGEMENT_TIMEOUT period after the observation time of the oldest application packet that was acknowledged at step d;
f. for all application packets that were acknowledged in steps d and e:
   i. if using one timeout timer per packet, cancel the timeout timer for this packet; and
   ii. if sharing the same timeout timer for all packets, remove the latest ACK time for this packet from the list of unacknowledged application packets. If the list is empty, cancel the timeout timer;
g. if a timeout timer expires before it is cancelled, it is implied that the number of application packets acknowledged (by estimation) and the corresponding number of bytes might be underestimated. Accordingly, in this situation:
   i. treat all unacknowledged application packets that occurred over ACKNOWLEDGMENT_TIMEOUT_SECONDS seconds ago as acknowledged (meaning they are estimated to be acknowledged) at the observation time of the selected acknowledgment packet as long as the earliest acknowledgement time is prior to this observation time. This observation time of the selected acknowledgement packet is treated as an acknowledgement timestamp, wherein the acknowledgment timestamp assigned to an acknowledged application packet is the observation time of a packet that was used to acknowledge that application packet;
   ii. if sharing the same timeout timer for a multitude of packets, and the list of unacknowledged application packets is not empty, reschedule the timeout timer to fire at the earliest latest ACK time in the list of unacknowledged packets.

The estimation module 202 estimates an amount of encrypted application data transported in either direction based on a sum of the estimated size of the encrypted application data in the respective acknowledged packets transported in the at least one of the opposing directions that were observed during a selected time interval.

In embodiments, the estimation module 202 can detect which application packets contain retransmitted data vs. newly transmitted data (e.g., due to tail loss probes, as mentioned above). Furthermore, in embodiments, the estimation module 202 does not include application packets that are determined to be retransmitted data for estimating the amount of encrypted application data transmitted in either direction. Rather, the estimation module 202 only uses newly transmitted data to determine the amount of encrypted application data transmitted in either direction.

In embodiments, the following algorithm can be used, such as for detecting packets retransmitted on a short term bases, e.g., immediately:

Algorithm (2)

If an endpoint sends two consecutive packets, then the second packet is likely a retransmission if all the following are true:
1. Both packets are application packets;
2. Both packets contain the same amount of application payload (or there is a threshold difference between the amounts, such as 0-2 bytes);
   a. packet size can be expressed in bytes—such as based on parsable encrypted transport header size in bytes;
3. At least X ms has elapsed between the packets (for example, X=30);
4. The packet size is less than the maximum size in bytes minus Y (for example, Y=30 bytes when the maximum size is 1350-1500 bytes):
   a. This condition is provided since a bulk data transfer often sends many packets near the maximum size. The conditions above are not intended to detect retransmissions in a bulk data transfer;
   b. The maximum size can be inferred based on the largest packet size seen so far;

In embodiments, the following algorithm can be used, such as for detecting tail loss probe retransmissions at the end of a bulk transfer:

Algorithm (3)

If an endpoint sends many consecutive application packets that are between [max−Y] bytes and [max] bytes (for example, Y=30 if the maximum size is 1350-1500 bytes) and the next N consecutive packets are application packets that are under [max−Y] bytes, then N−1 packets are likely retransmissions if all of the following are true:
1. All N packets are application packets;
2. All N packets contain the same amount of application payload (or within a threshold amount, such as 1-2 bytes);
3. Less than Z ms has elapsed between consecutive packets (for example, Z=30);

In both Algorithms (2) and (3), X, Y, and Z can be configurable.

The estimation module 202 can repeat the process of acknowledging application packets by iteratively (or simultaneously) selecting a next acknowledgement packet, such as by selecting the next packet in time, regardless of the direction in which that packet is transported. The estimation module 202 can use acknowledgement of application packets during the iterative (or simultaneous) process to update the estimated amount of encrypted application data transported in either direction.

The storage module 208 can store software modules that perform the method of the disclosure, such as estimation module 202 and region analysis module 204. Further, storage module 208 can store program data, including interim output and data that will be output to a user, such as via user interface module 210. Additionally, the storage module 208 can store variables and constants used by the software modules, such predetermined thresholds or values.

Figure 11:
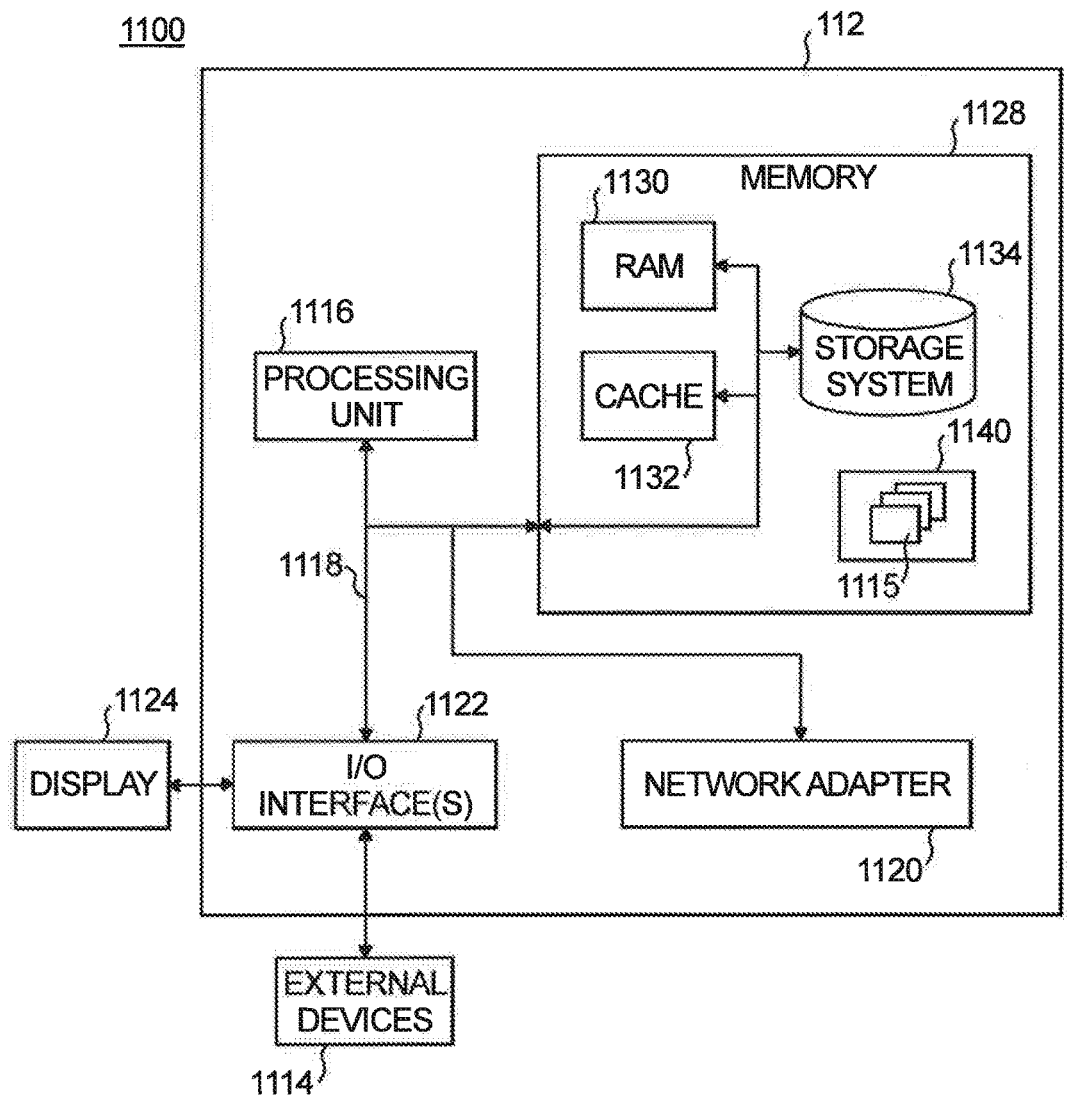
FIG. 11 illustrates a schematic block diagram of an example packet analysis system, in accordance with an illustrative embodiment of the present disclosure.

The UI module 210 can interface with user input devices, such as a keyboard, pointing device (e.g., mouse), touch screen, etc. The UI module 210 can receive data via the user input devices, wherein the received data can be input to the estimation module 202 and/or region analysis module 204. The UI module 210 can further interface with user output devices, such as a display monitor, audio speakers, and/or a printer to output data to a user. Thus, the UI module 210 provides an interface for exchanging data between a user and the estimation module 202 and/or region analysis module 204. The packet analysis system 112 can further interface with other processing devices to exchange data e.g., by receiving or transmitting data, to other processing devices or software modules, such as shown in FIG. 11.

Regarding the buffer 206 and the region analysis module 204, it is possible, in accordance with the example method of acknowledging application packets, that the acknowledgement timestamp of an application packet can be set to a time in the past (e.g., after the application packet's timeout period times out).

In order to handle such a situation, the method can further include steps to buffer network traffic in buffer 206 until payload timestamps and acknowledgement timestamps for acknowledged application packets increases monotonically over time.

Buffer 206 can buffer network traffic transported within a specified or sliding time window. For example, hundreds or thousands of packets can be buffered in buffer 206. The data stored in buffer 206 can be contiguous (but is not required as such) so that regions identified within the buffer 206 can provide indications of the quality of the estimations performed by the estimation module 202.

The buffer can store information about the encrypted packets that were transported. Examples of information that can be stored about the encrypted packets, which can be configured differently for different implementations, include:

Application data byte offset from beginning of the flow, which is analogous to the SEQ field in a TCP header, and can be populated by the estimation module 202;

Acknowledged data byte offset in the opposite direction, which is analogous to the ACK field in a TCP header, and is populated by and can be populated by the estimation module 202;

Timestamp;

Direction (e.g. from client vs. from server);

Number of bytes of application data (will be 0 for acknowledgement packets);

Other information that may need to be propagated per packet;

The data stored in the buffer can be contiguous, or can include gaps, such as due to some packets being missed by a packet intercept device 106.

The region analysis module 204 can process data that has been buffered in buffer 206, including scanning the packets in this buffer to identify regions of the buffer where it is desirable to improve the region's estimates, such as estimates of which packets are acknowledged and the amount of application data included in the packets estimated to be acknowledged. Such regions can correspond to contiguous (or non-contiguous) network traffic that was observed within a particular time interval, or can include gaps, such as due to some packets being missed by a packet intercept device 106.

For example, a region that may be a candidate for improvement of estimates may include packets that were estimated to not include application data, but were not used to acknowledge other packets. Another indication that a region may be a candidate for improvement of estimates may be when packets estimated to be application packets precede an acknowledgement that acknowledged these application packets, and the acknowledgement was triggered by expiration of the timeout period associated with the application packets. These conditions indicate a low confidence in the region's estimates.

On the other hand, the region analysis module 204 can determine that a high confidence can be associated with the estimates for that region when there are not such indications that improvements are needed to estimates associated with the region. For example, high confidence can be associated with a region in which payload and acknowledgement timestamps for acknowledged application packets included in the region increase monotonically over time.

The region analysis module 204 can expand a region to include packets that will increase the confidence associated with the region, such as when the number of unacknowledged bytes for that region can be estimated with high confidence. High confidence of unacknowledged bytes can be indicated by a series of acknowledgment packets followed by a quiet period without any packets. There is a high probability that the last acknowledgement packet of the series indicates zero bytes in flight, wherein "bytes in flight" herein refers to an amount of data that has been sent but has not yet been acknowledged. It can be estimated with high confidence that the last acknowledgment packet of the series acknowledged the last byte that was in flight.

The region analysis module 204 can further estimate a total number of acknowledgement packets observed in a region having a confidence level that has been determined to be relatively high, the region being referred to as a high confidence region. For example, the acknowledgement packets can be estimated to be acknowledgment packets based on a determination that the packet does not include a threshold amount of application data. The threshold amount may be more than zero bytes of application data, wherein the application data has been estimated to include only retransmitted application data. In practice, acknowledgement packets (e.g., QUIC acknowledgment packets) have payload after the parsable header (e.g., SACK information). In embodiments, the packet type (application or acknowledgement) can be determined before determining the amount of application data. In embodiments, the determination of the amount of application data can be performed by disregarding data determined to be retransmitted data.

The region analysis module 204 can further estimate, for a buffered portion in between a first and second high confidence region, a number of application packets that have been acknowledged per acknowledgement packet The estimation uses the estimated total number of acknowledgement packets observed in the buffered portion and a total number of packets in the buffered portion. The estimation further includes linearly interpolating a number of packets acknowledged by the acknowledgement packets in the buffered portion based on the estimates for this metric for the high confidence regions on either side of the buffered portion. The interpolation can be performed using an algorithm such as Bresenham's line algorithm or Wu's algorithm, as referenced in https://en.wikipedia.org/wiki/Bresenham's_line_algorithm, without limitation to these specific algorithms. For example, a linear equation can be estimated for the number of applications packets estimated to be acknowledged per acknowledgment packet for each of the high confidence regions. The buffered portion in between these two high confidence regions can be interpolated based on this line.

It is noted that the interpolation may fail if the high confidence regions are spaced far apart from one another within the buffer, and there are periods of time that appear to have a negative number of bytes in flight associated with either of the buffers. Since a negative number of bytes in flight in not possible, an error handling mechanisms can be used, such as (without limitation to the specific examples): a) abort interpolation and use the original values, or b) adjust the values after interpolation to avoid having a negative number of bytes in flight.

The region analysis module 204 can tune parameters used in the method for estimating the number of acknowledged application packets and estimating the amount of acknowledged data in the acknowledged application packets. Parameters that can be tuned include any combination of one or more of an earliest acknowledgment time, a timeout period, and threshold values, such as:

DELAYED_ACKNOWLEDGEMENT_TIMEOUT;

Maximum difference in the amount of packets to buffer between the estimation module 202 and the region analysis module 204;

Maximum difference in timestamps (i.e., latency) of packets buffered between the estimation module 202 and the region analysis module 204;

Maximum number of packets to acknowledge simultaneously;

Minimum acknowledgement time, such as determined as a function of a factor, such as estimated RTT;

Selected method for handling non-monotonic timestamps;

Selected method to handle gaps in the buffer/regions; and

Selected method to handle negative bytes-in-flight during interpolation;

The parameter(s) can be tuned, for example, to minimize the number of times an acknowledgment packet was unused, meaning the acknowledgement packet was estimated to not contain any application data, but was not used to acknowledge any application data packets. The parameter(s) can further be tuned, for example, to minimize the number of times that a timeout period expired before an application packet was acknowledged.

With reference to FIGS. 3-9, shown are flowcharts demonstrating implementation of the various exemplary embodiments. It is noted that the order of operations shown in FIGS. 3-9 is not required, so in principle, the various operations may be performed out of the illustrated order or in parallel. Also certain operations may be skipped, different operations may be added or substituted, or selected operations or groups of operations may be performed in a separate application following the embodiments described herein.

Figure 3:
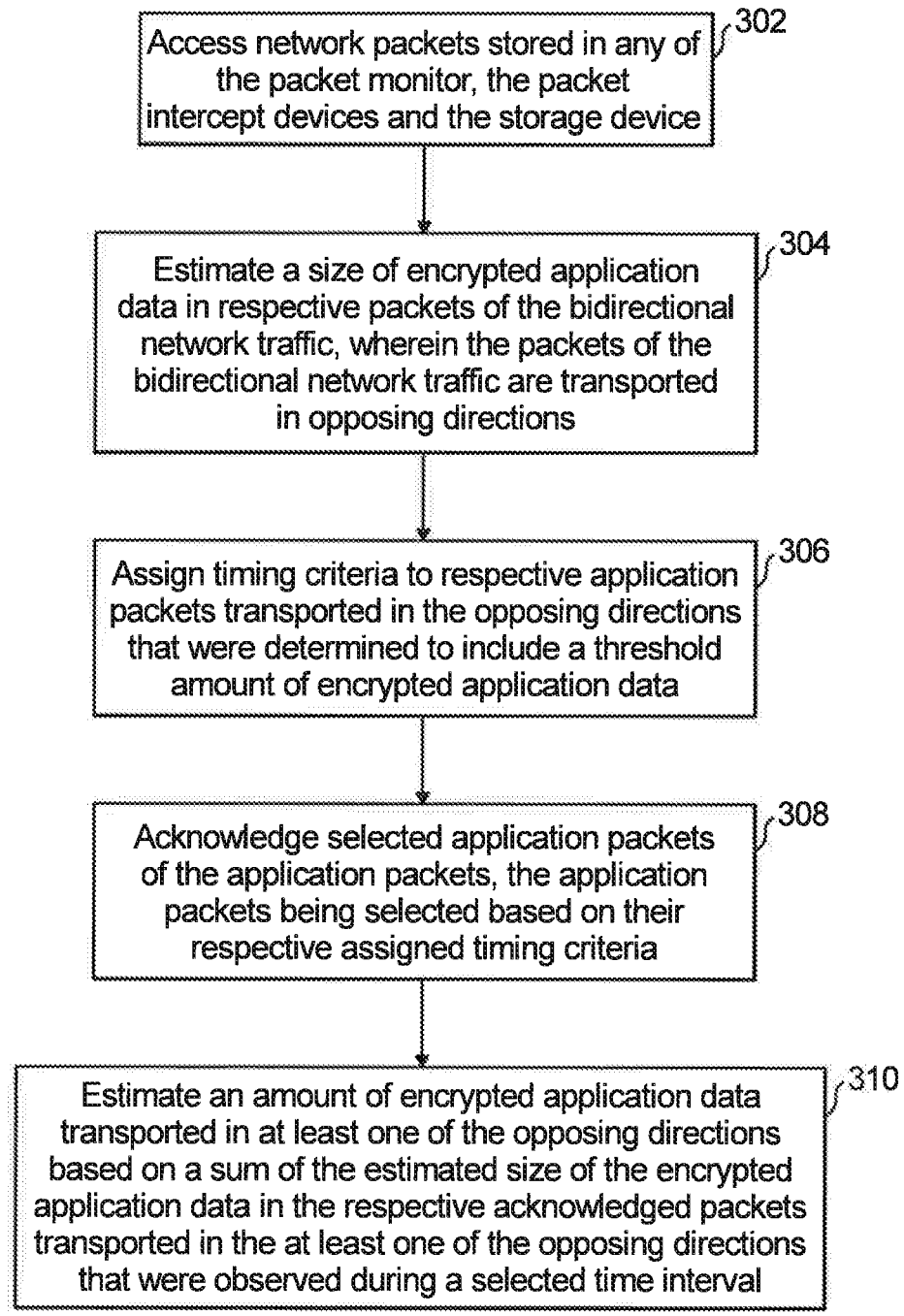
FIGS. 3-9 illustrate flowcharts showing respective methods performed by the network analytics system in accordance with embodiments of the disclosure.

With reference to FIG. 3, a method is shown for processing bidirectional network traffic that has encrypted application data to estimate an amount of encrypted application data transported in specific directions.

At operation 302 network packets are accessed that were monitored and stored, such as by the packet monitor 108, the packet intercept devices 106 and the storage device 114. The term "access," as used herein refers reading, copying, retrieving, receiving a transmission with or without requesting the transmission, or otherwise obtaining.

At operation 304, a size of encrypted application data in respective packets of the bidirectional network traffic is estimated, herein the packets of the bidirectional network traffic are transported in opposing directions.

In embodiments, estimating the size of encrypted application data in a packet of the respective packets includes estimating whether the packet includes application data based on at least one of a size of payload data of the packet and an estimated size of a header of the packet. Furthermore, in embodiments, estimating whether the packet includes application data is based on at least one of relative timing of observation of the packet and detection of a condition that causes the size of acknowledgement packets that do not include application data to increase.

At operation 306, timing criteria is assigned to respective application packets transported in the opposing directions that were determined to include a threshold amount of encrypted application data. The timing criteria are based on a time of observation at an observation point of the corresponding application packet.

At operation 308, selected application packets of the application packets are acknowledged, wherein the application packets are selected based on the timing criteria assigned to the respective application packets. It is understood that these acknowledged packets are actually applications that are estimated to be application packets which have been estimated to be acknowledged. At operation 310, an amount of encrypted application data transported in at least one of the opposing directions is estimated. The estimation is based on a sum of the estimated size of the encrypted application data in the respective acknowledged packets transported in the at least one of the opposing directions that were observed during a selected time interval.

Figure 4:
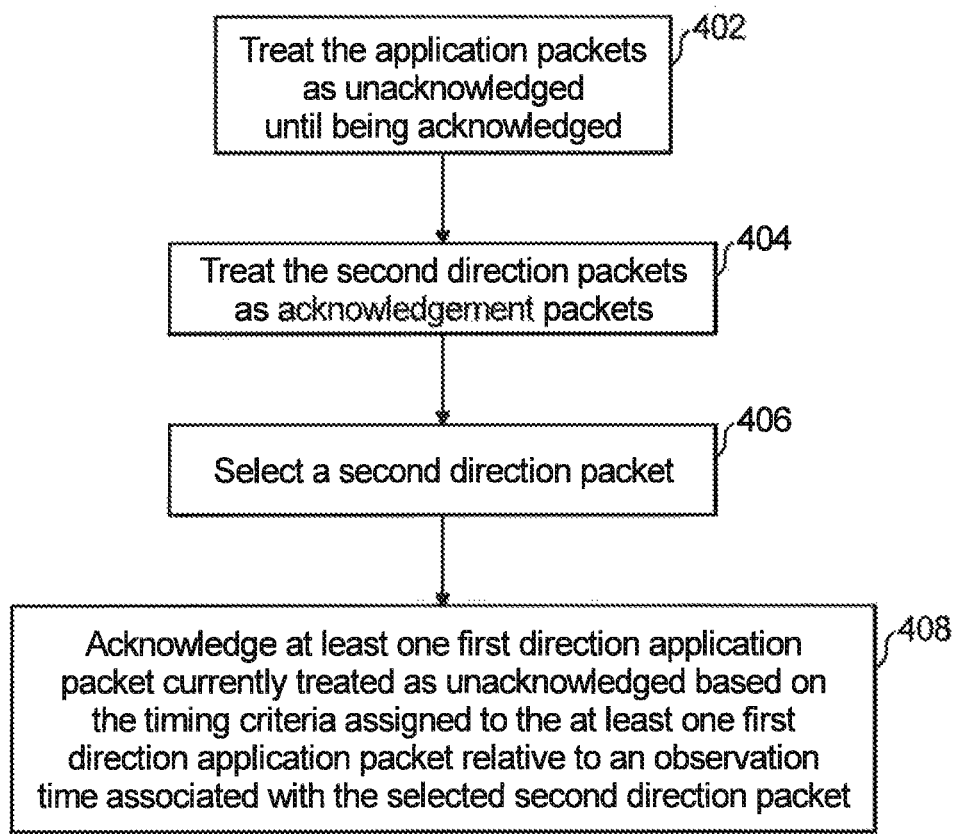

With reference to FIG. 4, a method is shown for acknowledging packets of the network traffic. It is understood that acknowledging these packets is actually an estimate that the packets estimated to be application packets were acknowledged. At operation 402, the application packets are treated as unacknowledged until they are acknowledged. At operation 404, the second direction packets are treated as acknowledgement packets. At operation 406, a second direction packet is selected.

At operation 408, at least one first direction application packet is acknowledged that is currently being treated as unacknowledged. The acknowledgment of the first direction application packet is based on the timing criteria assigned to the at least one first direction application packet relative to an observation time associated with the selected second direction packet. For example, acknowledging of the at least one first direction application packet can include first acknowledging an oldest unacknowledged first direction application packet having assigned timing criteria that satisfy a first condition.

In embodiments, the timing criteria assigned to the respective application packets includes an earliest acknowledgement time at which the corresponding application packet can be acknowledged. Furthermore, in embodiments, the earliest acknowledgement time assigned to the respective application packets is determined based on estimated round trip time associated with the network traffic. Additionally, in embodiments the first condition includes the earliest acknowledgement time assigned to the first direction application packet has occurred after the time of observation of the selected second direction packet.

In embodiments, acknowledging the at least one first direction application packet following acknowledgement of the oldest unacknowledged first direction application packet further includes acknowledging up to a maximum number of first direction application packets having respective assigned timing criteria that satisfy a second condition. The second condition can include elapse of less than a maximum delay time period since an observation time associated with the first direction application packet.

In embodiments, the timing criteria assigned to the respective application packets include an earliest acknowledgement time at which the corresponding application packet can be acknowledged and a timeout period that expires a predetermined time period measured from an observation time of the corresponding application packet. In embodiments, upon acknowledgment of a first direction application packet, the timeout period associated with that packet is cancelled.

In embodiments, acknowledging the at least one first direction application packet includes acknowledging first direction application packets that satisfy a third condition. The third condition can include occurrence of the earliest acknowledgement time assigned to the first direction application packet after the time of observation of the selected second direction packet. The third condition can further include expiration of the timeout period associated with the first direction application packet.

The methods shown in FIG. 3 and/or FIG. 4 can be performed in multiple passes that can be performed iteratively or simultaneously. For each pass, a next packet of the network traffic is selected to be the second direction packet, wherein the next packet is transported in either of the first and second opposing directions. In this way, packets transported in either direction can be used to acknowledge application packets transported in the opposite direction. A packet can be selected to be the next second direction packet, regardless of whether the packet has been estimated to be an application packet or an acknowledgment packet. Acknowledgement packets are those packets that were not determined to be application packets, such as based on not including a threshold amount of encrypted application data.

Figure 5:
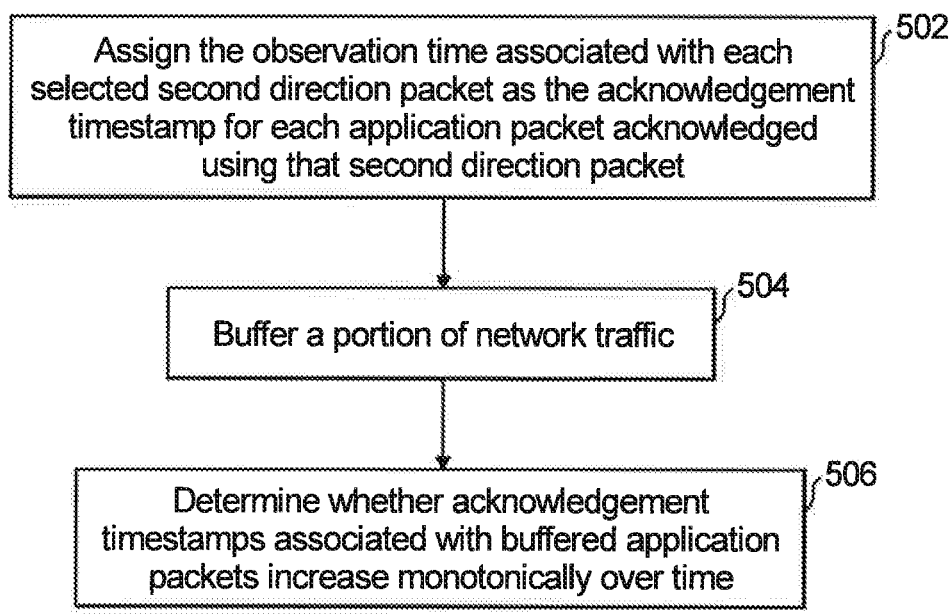

With reference to FIG. 5, a method is shown for processing network traffic. As previously stated, any combination of one or more of operations 502, 504, and 506 can be performed, and these operations can be performed in any order and/or in parallel. At operation 502, the observation time associated with each selected second direction packet is assigned as the acknowledgement timestamp for each application packet acknowledged (i.e., estimated to be acknowledged) using that second direction packet. At operation 504, a portion of the network traffic is buffered. The network traffic that is buffered can be contiguous, but is not limited as such. At operation 506, a determination is made whether acknowledgement timestamps associated with buffered application packets increase monotonically over time.

Figure 6:
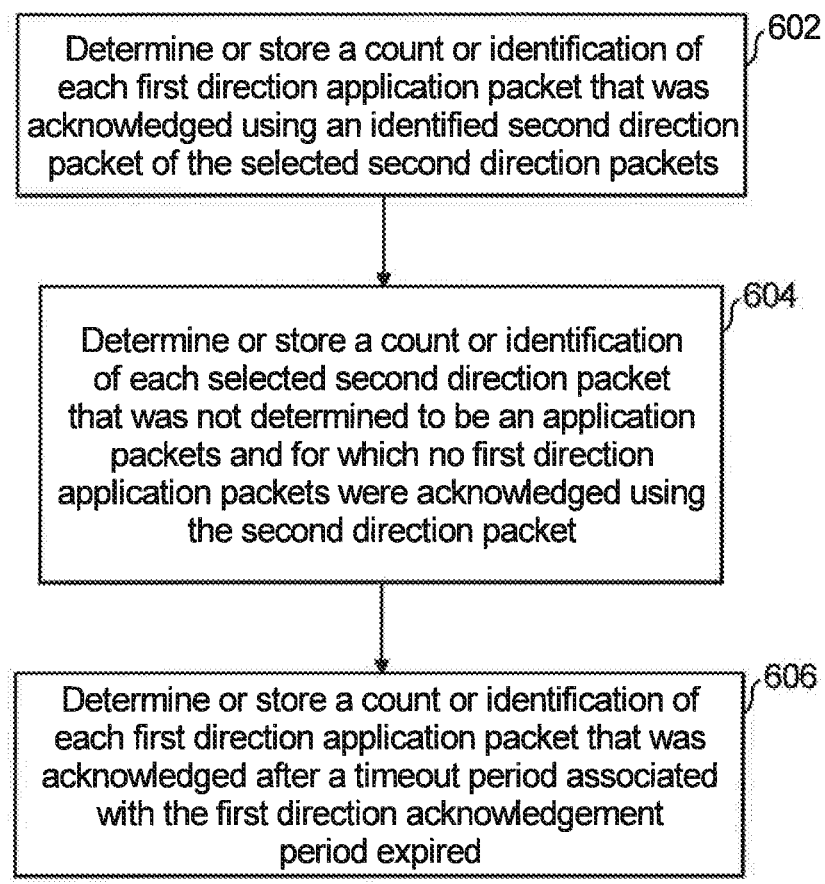

With reference to FIG. 6, a method is shown to determine or store one or more different counts or identifications of various packets of the network traffic. As previously stated, different combination of one or more of operations 602, 604, and 606 can be performed. At operation 602, a count or identification of each first direction application packet that was acknowledged (i.e., estimated to be acknowledged) using an identified second direction packet of the selected second direction packets is determined or stored. At operation 604, a count or identification of each selected second direction packet that was not determined to be an application packets and for which no first direction application packets were acknowledged (i.e., estimated to be acknowledged) using that second direction packet is determined or stored. At operation 606, a count or identification of each first direction application packet that was acknowledged (i.e., estimated to be acknowledged) after a timeout period associated with the first direction acknowledgement period expired is determined or stored.

Additionally, the counts determined at steps 602, 604, and 606 can be associated with the appropriate packet type (the types of packets being application or acknowledgment). First counters can be used to store the count of application packets, and second counters can be used to store the count of acknowledgement packets.

Figure 7:
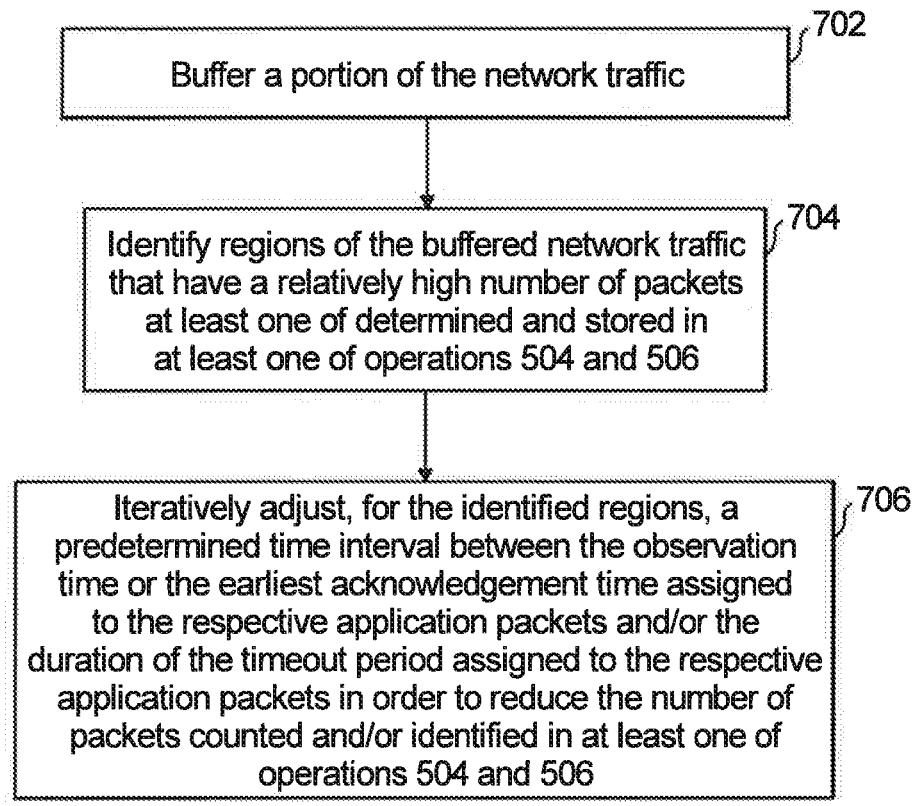

With reference to FIG. 7, a method is shown for processing buffered data associated with the network traffic. At operation 702, a portion of the network traffic is buffered. The network traffic that is buffered can be contiguous, but is not limited as such. At operation 704, one or more regions of the buffered network traffic are identified that have a relatively high number of packets determined or stored in at least one of operations 504 and 506. At operation 706, a predetermined time interval between the observation time or the earliest acknowledgement time assigned to the respective application packets is adjusted and/or the duration of the timeout period assigned to the respective application packets is adjusted in order to reduce the number of packets counted and/or identified in at least one of operations 504 and 506.

Figure 8:
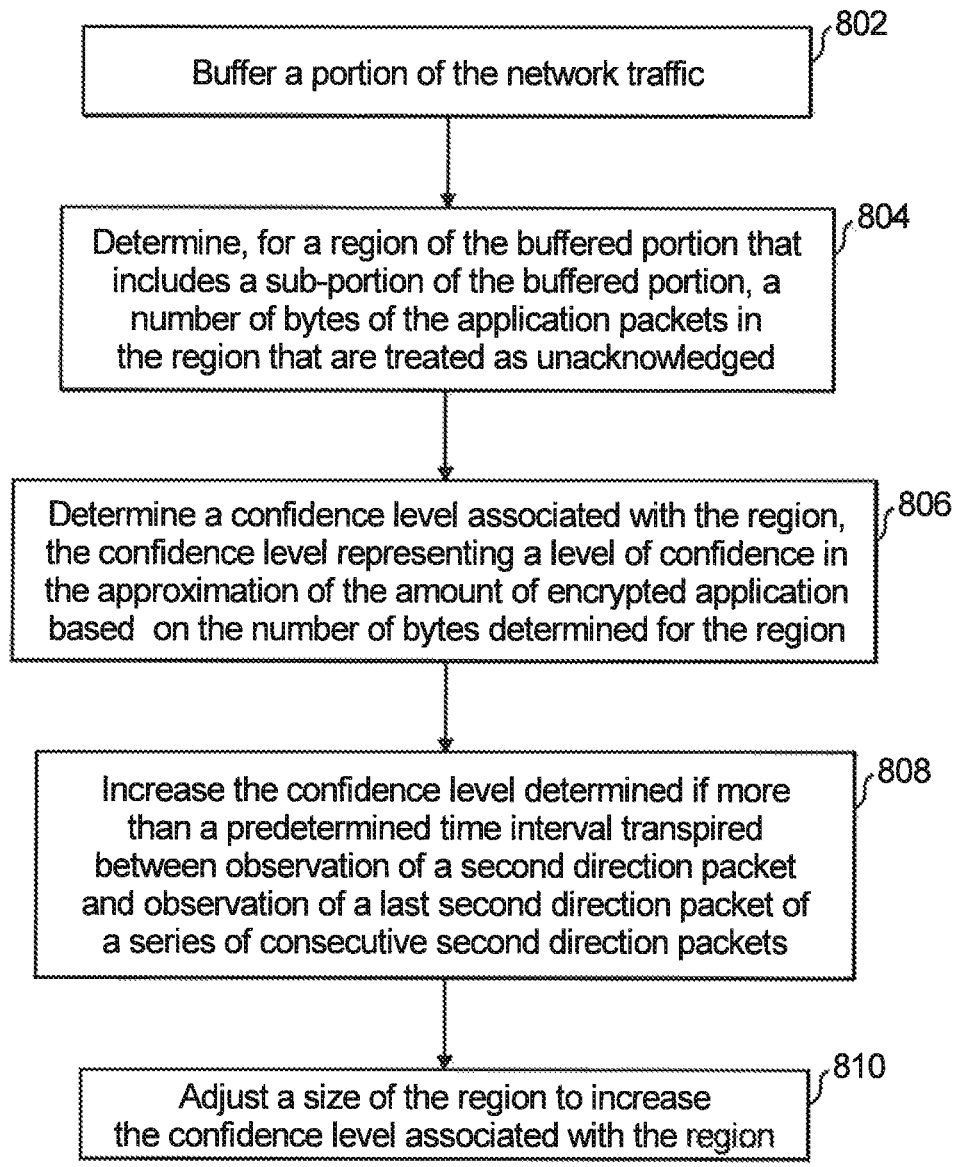

With reference to FIG. 8, a method is shown for processing a confidence level associated with a region identified in buffered network traffic. As previously stated, different combination of one or more of operations 802-810 can be performed.

At operation 802, a portion of the network traffic is buffered. The network traffic that is buffered can be contiguous, but is not limited as such. At operation 804 a number of bytes of the application packets in the region that are treated as unacknowledged are determined for a region of the buffered portion that includes a sub-portion of the buffered portion. The sub-portion of the buffered portion can be contiguous, but is not limited as such.

At operation 806, a confidence level is determined and associated with different regions of the buffered network traffic. The confidence level represents confidence in the estimation of the amount of encrypted application. The confidence level can be based on, for example, the number of bytes determined for the region.

At operation 808, the confidence level determined is increased if more than a predetermined time interval transpired between observation of a second direction packet and observation of a last second direction packet of a series of consecutive second direction packets. At operation 810, a size of the region is adjusted to increase the confidence level associated with the region.

Figure 9:
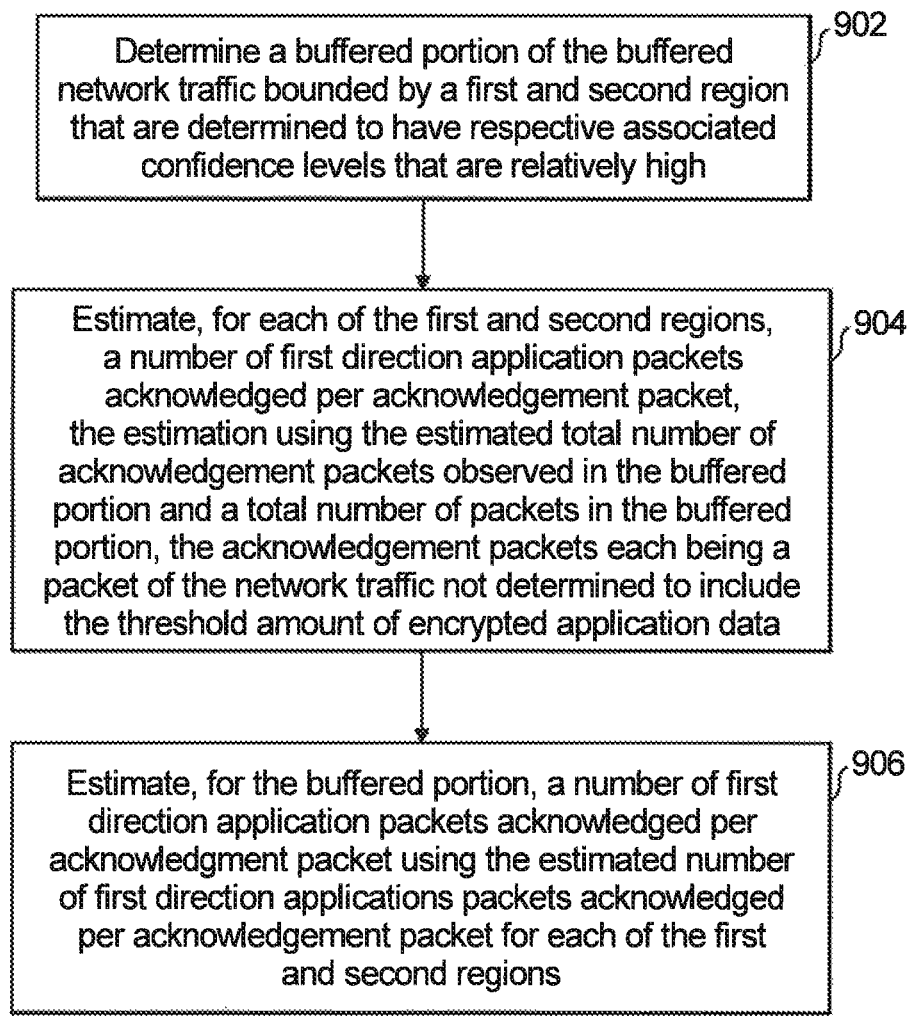

With reference to FIG. 9, a method is shown for using determinations associated with regions having an associated high confidence level to aid in making determinations for regions that do not have an associated high confidence level. At operation 902, a buffered portion of the buffered network traffic is determined that is bounded by a first and second region, wherein the first and second region are determined to have respective associated confidence levels that are relatively high. At operation, 904, for each of the first and second regions, a number of first direction application packets acknowledged (i.e., estimated to be acknowledged) per acknowledgement packet is estimated, wherein the estimation uses the estimated total number of acknowledgement packets observed in the buffered portion and a total number of packets in the buffered portion. At operation 906, a number of first direction application packets acknowledged per acknowledgment packet is estimated for the buffered portion using the estimated number of first direction applications packets acknowledged (i.e., estimated to be acknowledged) per acknowledgement packet for each of the first and second regions. For example, a linear interpolation of the estimated number of first direction applications packets acknowledged (i.e., estimated to be acknowledged) per acknowledgement packet for each of the first and second regions can be used to perform the estimation at operation 906.

Figure 10:
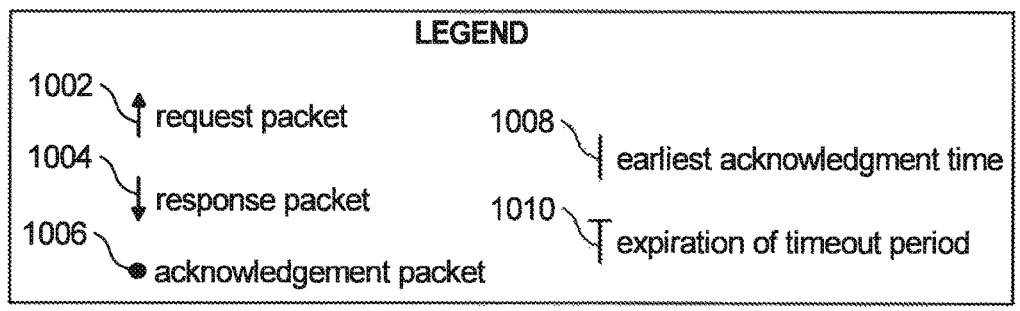
FIG. 10 shows plots of example segments of network traffic plotted over time to illustrate embodiments of application of methods of the disclosure.
Figure 10:
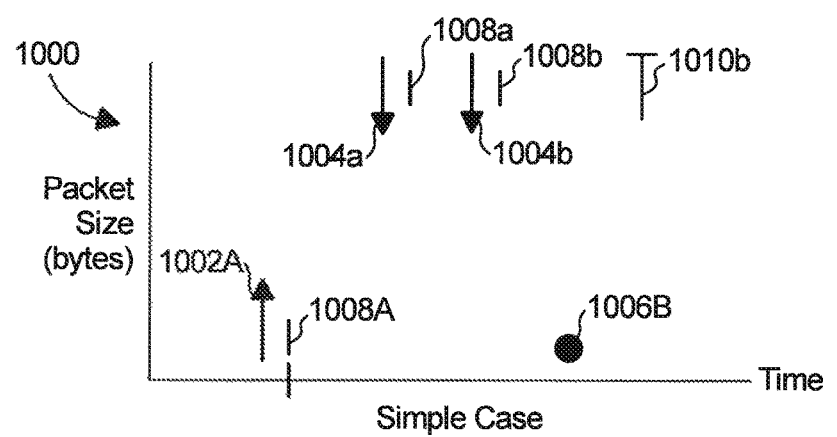
Figure 10:
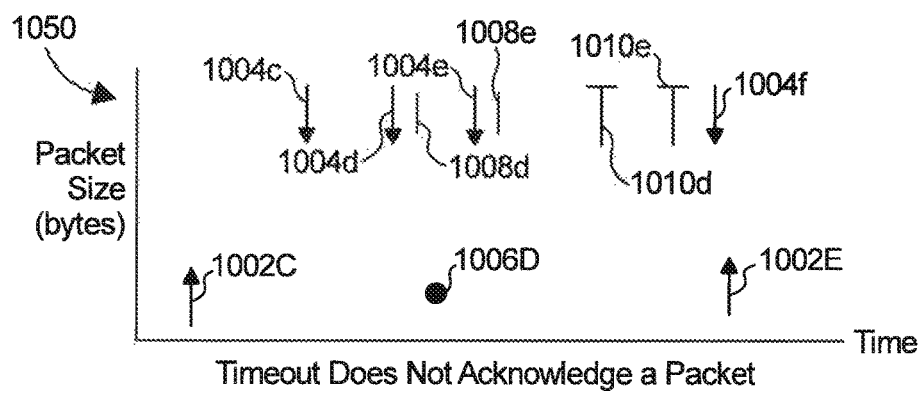

FIG. 10 shows plots 1000 and 1050 of example segments of bidirectional network traffic plotted over time in different scenarios that illustrate embodiments of application of Algorithm (1). The bidirectional network traffic includes application packets, including request packets 1002 and response packets 1004, and acknowledgment packets 1006. The horizontal axis represents time and the vertical axis represents packet size, such as measured in bytes. Earliest acknowledgement times 1008 and expiration of timeout periods 1010 are shown for some of the application packets.

Plot 1000 illustrates a first scenario. A request packet 1002A, response packets 1004a and 1004b, and acknowledgement packet 1006B are plotted. The earliest acknowledgement times 1008A, 1008a, and 1008b are shown, which correspond respectively to request packet 1002A, response packet 1004a, and response packet 1008b. In this scenario, the time difference between observation of response packet 1006B and request packet 1002A is greater than DELAYED_ACKNOWLEDGEMENT_TIMEOUT. Applying Algorithm (1) to the first scenario:

Response packet 1004a acknowledges (by estimation) request packet 1002A at step d; and Acknowledgment packet 1006B acknowledges (by estimation) response packet 1004a at step d.

If the predetermined maximum number of oldest unacknowledged application packets that can be acknowledged using one acknowledgment packet is two or more, then acknowledgment packet 1006B acknowledges (by estimation) response packet 1004b at step e.

Otherwise, acknowledgement packet 1006B acknowledges (by estimation) response packet 1004b after the timeout period associated with response packet 1004b expires in step g. The acknowledgement timer for packet 1004b is not cancelled since there are no packets from the opposite direction before the timer expires. Timeout period 1010b shown corresponds to response packet 1004b, indicating the time at which response packet 1004b's timeout occurs.

Plot 1050 illustrates a second scenario. A request packets 1002C and 1002E, response packets 1004c, 1004d, 1004e, and 1004f, and acknowledgement packet 1006D are plotted. The earliest acknowledgement times 1008d and 1008e are shown, which correspond respectively to response packets 1004d and 1004e. Timeout periods 1010d and 1010e are shown that indicate a time at which response packets 1004d and 1004e occur, respectively. Applying Algorithm (1) to the second scenario:

Response packet 1004c acknowledges (by estimation) request packet 1002C at step d; and Acknowledgment packet 1006D acknowledges (by estimation) response packet 1004c at step d.

If the predetermined maximum number of oldest unacknowledged application packets that can be acknowledged (by estimation) using one acknowledgment packet is one or more, then acknowledgment packet 1006D acknowledges response packet 1004d at step e.

Otherwise, acknowledgement packet 1006D acknowledges (by estimation) response packet 1004d after the timeout period associated with response packet 1004d expires in step g, as indicated by 1010d.

However, when the timeout period for response packet 1004e expires before it is cancelled, an acknowledgement of response packet 1004e does not occur at step g because there have been no request packets 1002 or acknowledgement packets 1004 observed after the earliest acknowledgement time 1008e of response packet 1004e.

Yet, once request packet 1002E is observed:
Response packet 1004e is acknowledged (by estimation) by request packet 1002E at step b; and
Response packet 1004f is acknowledged (by estimation) by request packet 1002E at step d.

It is noted that response packets 1004b, 1004d, 1004e and 1004f do not acknowledge any new data.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the packet analysis system 112 may be implemented or executed by one or more computer systems. For example, packet analysis system can be implemented using a computer system such as example computer system 1102 illustrated in FIG. 11. In various embodiments, computer system 1102 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1102 is only one example of a suitable system and is not intended to suggest any limitation as to the scope of use or functionality of embodiments of the disclosure described herein. Regardless, computer system 1102 is capable of being implemented and/or performing any of the functionality set forth hereinabove.

Computer system 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system 1102 may be practiced in distributed data processing environments where tasks are performed by remote processing devices that are linked through a communications network. In a distributed data processing environment, program modules may be located in both local and remote computer system storage media including memory storage devices.

Computer system 1102 is shown in FIG. 11 in the form of a general-purpose computing device. The components of computer system 1102 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1102 typically includes a variety of computer system readable media. Such media may be any available media that is accessible by the packet analysis system 112, and it includes both volatile and non-volatile media, removable and non-removable media.

System memory 1128 can include computer system readable media in the form of volatile memory, such as random access memory (RAM) 1130 and/or cache memory 1132. Computer system 1102 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the disclosure.

Program/utility 1140, having a set (at least one) of program modules 1115, such as estimation module 202 and region analysis module 204, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1115 generally carry out the functions and/or methodologies of embodiments of the disclosure as described herein.

Computer system 1102 may also communicate with one or more external devices 1114 such as a keyboard, a pointing device, a display 1124, etc.; one or more devices that enable a user to interact with computer system 1102; and/or any devices (e.g., network card, modem, etc.) that enable the packet analysis system 112 to communicate with one or more other computing devices. Such communication can occur via Input/Output (I/O) interfaces 1122. Still yet, computer system 1102 can communicate with one or more networks such as a local area network (LAN), a general wide area network (WAN), and/or a public network (e.g., the Internet) via network adapter 1120. As depicted, network adapter 1120 communicates with the other components of the packet analysis system 112 via bus 1118. It should be understood that although not shown, other hardware and/or software components could be used in conjunction with computer system 1102. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method the ability to perform deep traffic analysis on flows that use encrypted transport protocols, which typically uses information in the packets that is encrypted by the transport protocol. Accordingly, the deep traffic analysis can be performed with flows using encrypted transport protocols without the need to decrypt, but rather based on inferences, such as by using information about whether and when specific application packets are estimated to be acknowledged. The analysis can validate, for example, whether application data sent by an endpoint is in response to a request made by the other endpoint, or measure an amount of time a flow does not have any traffic in flight.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer implemented method to process bidirectional network traffic having encrypted application data and using an encrypted transport protocol, the method comprising:

estimating, by at least one processing device, a size of encrypted application data in respective packets of the bidirectional network traffic, wherein the packets of the bidirectional network traffic are transported in opposing directions;

assigning, by the at least one processing device, timing criteria to the respective application packets transported in the opposing directions that were determined to include a minimum amount of encrypted application data, the timing criteria being based on a time of observation at an observation point of the corresponding application packet;

acknowledging, by the at least one processing device, for the respective packets of the application packets, application packets selected based on the timing criteria assigned to the respective application packets; and estimating, by the at least one processing device, an amount of encrypted application data transported in at least one of the opposing directions, the estimation of the amount of encrypted application data being based on a sum of the estimated size of the encrypted application data in the respective acknowledged packets transported in the at least one of the opposing directions that were observed during a selected time interval.

2. The computer implemented method of claim 1, wherein the application packets transported in a first direction of the opposing directions include first direction application packets, and packets transported in a second direction of the opposing directions include second direction packets, wherein acknowledging the selected application packets comprises: treating the application packets as unacknowledged until being acknowledged; treating the second direction packets as acknowledgement packets; selecting a second direction packet; and acknowledging at least one first direction application packet currently treated as unacknowledged based on the timing criteria assigned to the at least one first direction application packet relative to an observation time associated with the selected second direction packet.

3. The computer implemented method of claim 2, acknowledging the at least one first direction application packet includes acknowledging an oldest unacknowledged first direction application packet having assigned timing criteria that satisfy a first condition.

4. The computer implemented method of claim 3, wherein the timing criteria assigned to the respective application packets includes an earliest acknowledgement time at which the corresponding application packet can be acknowledged, and the first condition includes the earliest acknowledgement time assigned to the first direction application packet has occurred after the time of observation of the selected second direction packet.

5. The computer implemented method of claim 4, wherein the earliest acknowledgement time assigned to the respective application packets is determined based on estimated round trip time associated with the network traffic.

6. The computer implemented method of claim 4, wherein acknowledging the at least one first direction application packet further includes acknowledging up to a maximum number of the first direction application packets having respective assigned timing criteria that satisfy a second condition.

7. The computer implemented method of claim 6, wherein the second condition includes less than a maximum delay time period has elapsed since the observation time associated with the first direction application packet.

8. The computer implemented method of claim 6, wherein the timing criteria assigned to the respective application packets includes an earliest acknowledgement time at which the corresponding application packet can be acknowledged and a timeout period that expires a predetermined time period measured from an observation time of the corresponding application packet, wherein acknowledging the at least one first direction application packet includes acknowledging the first direction application packets that satisfy a third condition, the third condition being that the earliest acknowledgement time assigned to the first direction application packet occurred after the time of observation of the selected second direction packet, and the timeout period associated with the first direction application packet expired.

9. The computer implemented method of claim 8, further comprising cancelling the timeout period once the at least one first direction application packet is acknowledged.

10. The computer implemented method of claim 9, further comprising: iteratively or simultaneously selecting a next packet of the network traffic to be the second direction packet, the next packet being transported in one of the first and second opposing directions; acknowledging at least one first direction application packet that is transported in a direction opposing the direction of the next packet and that is currently treated as unacknowledged, acknowledging the at least one first direction application packet being based on the timing criteria assigned to the at least one first direction application packet relative to an observation time associated with the selected next direction packet; and at least one of determining and storing at least one of: (a) a count and identification of each first direction application packet that was acknowledged using an identified second direction packet of the selected second direction packets; (b) a count and identification of second direction packets of each selected second direction packet that was not determined to be an application packets and for which no first direction application packets were acknowledged using that second direction packet; and (c) a count and identification of each first direction application packet that was acknowledged after a timeout period associated with the first direction acknowledgement period expired.

11. The computer implemented method of claim 10, further comprising buffering a portion of the network traffic;

identifying regions of the buffered network traffic that have a relatively high number of packets at least one of determined and stored in at least one of conditions (b) and (c) of claim 10; and iteratively or simultaneously adjusting, for the identified regions, at least one of a predetermined time interval between the observation time and the earliest acknowledgement time assigned to the respective application packets and the duration of the timeout period assigned to the respective application packets in order to reduce the number of packets counted and/or identified in steps (b) and (c) of claim 10.

12. The computer implemented method of claim 2, further comprising:

iteratively or simultaneously selecting a next packet of the network traffic to be the second direction packet, the next packet being transported in one of the first and second opposing directions; and acknowledging at least one first direction application packet that is transported in a direction opposing the direction of the next packet and that is currently treated as unacknowledged, acknowledging the at least one first direction application packet being based on the timing criteria assigned to the at least one first direction application packet relative to an observation time associated with the selected next direction packet.

13. The computer implemented method of claim 12, further comprising:
buffering a portion of the network traffic; and
determining whether acknowledgement timestamps associated with buffered application packets increase monotonically over time, wherein the observation time associated with the selected second direction packet is assigned as the acknowledgement timestamp for each application packet acknowledged using the second direction packet.

14. The computer implemented method of claim 12, further comprising:
buffering a portion of the network traffic;
estimating for a region of the buffered portion that includes a sub-portion of the buffered portion a number of bytes of the application packets in the region that are treated as unacknowledged; and
determining a confidence level associated with the region that represents confidence in the estimation of the amount of encrypted application based on the number of bytes estimated for the region.

15. The computer implemented method of claim 14, further comprising increasing the confidence level determined if more than a predetermined time interval transpired between observation of a second direction packet and observation of a last second direction packet of a series of consecutive second direction packets.

16. The computer implemented method of claim 14, further comprising adjusting a size of the region to increase the confidence level associated with the region.

17. The computer implemented method of claim 14, further comprising:
determining a buffered portion of the buffered network traffic bounded by a first and second region that are determined to have respective associated confidence levels that are relatively high;
estimating for each of the first and second regions a number of first direction application packets acknowledged per acknowledgement packet, the estimation using the estimated total number of acknowledgement packets observed in the buffered portion and a total number of packets in the buffered portion, the acknowledgement packets each being a packet of the network traffic not determined to include the threshold amount of encrypted application data; and
estimating for the buffered portion a number of first direction application packets acknowledged per acknowledgment packet using the estimated number of first direction applications packets acknowledged per acknowledgement packet for each of the first and second regions.

18. The computer implemented method of claim 1, wherein estimating the size of the encrypted application data in a packet of the respective packets includes estimating whether the packet includes application data based on at least one of a size of payload data of the packet and an estimated size of a header of the packet.

19. The computer implemented method of claim 18, wherein estimating whether the packet includes application data is further based on at least one of relative timing of observation of the packet and detection of a condition that causes the size of the acknowledgement packets that do not include application data to increase.

20. The computer implemented method of claim 1, further comprising determining which acknowledged packets include retransmitted data.

21. The computer implemented method of claim 20 further comprising excluding the acknowledged packets that were determined to include retransmitted data from the sum of the estimated size of the encrypted application data that corresponds to the acknowledged packets transported in the at least one of the opposing directions.

22. A system to process bidirectional network traffic having encrypted application data and using an encrypted transport protocol, the system comprising:
a memory configured to store instructions;
a processor disposed in communication with the memory, wherein the processor upon execution of the instructions is configured to:
estimate a size of encrypted application data in respective packets of the bidirectional network traffic, wherein the packets of the bidirectional network traffic are transported in opposing directions;
assign timing criteria to the respective application packets transported in the opposing directions that were determined to include a minimum amount of encrypted application data, the timing criteria being based on a time of observation at an observation point of the corresponding application packet;
acknowledge, for the respective packets of the application packets, selected application packets that were selected based on the timing criteria assigned to the respective application packets; and
estimate an amount of encrypted application data transported in at least one of the opposing directions, the estimation of the amount of encrypted application data being based on a sum of the estimated size of the encrypted application data in the respective acknowledged packets transported in the at least one of the opposing directions that were observed during a selected time interval.

23. The system of claim 22, wherein the application packets transported in a first direction of the opposing directions include first direction application packets and packets transported in a second direction of the opposing directions include second direction packets, wherein acknowledging the selected application packets by the processor, upon execution of the instructions, further comprises: treating the application packets as unacknowledged until being acknowledged; treating the second direction packets as acknowledgement packets; selecting a second direction packet; and acknowledging at least one first direction application packet currently treated as unacknowledged based on the timing criteria assigned to the at least one first direction application packet relative to an observation time associated with the selected second direction packet.

24. A non-transitory computer readable storage medium and one or more computer programs embedded therein, the computer programs comprising instructions, which when executed by a computer system, cause the computer system to:
estimate a size of encrypted application data in respective packets of the bidirectional network traffic, wherein the packets of the bidirectional network traffic are transported in opposing directions;
assign timing criteria to the respective application packets transported in the opposing directions that were determined to include a minimum amount of encrypted application data, the timing criteria being based on a time of observation at an observation point of the corresponding application packet;

acknowledge, for the respective packets of the application packets, selected application packets that were selected based on the timing criteria assigned to the respective application packets; and estimate an amount of encrypted application data transported in at least one of the opposing directions, the estimation of the amount of encrypted application data being based on a sum of the estimated size of the encrypted application data in the respective acknowledged packets transported in the at least one of the opposing directions that were observed during a selected time interval.

25. The computer readable storage medium of claim 24, wherein the application packets transported in a first direction of the opposing directions include first direction application packets and packets transported in a second direction of the opposing directions include second direction packets, and wherein acknowledging the selected application packets, the computer system, upon execution of the instructions, is further caused to: treat the application packets as unacknowledged until being acknowledged; treat the second direction packets as acknowledgement packets; select a second direction packet; and acknowledge at least one first direction application packet currently treated as unacknowledged based on the timing criteria assigned to the at least one first direction application packet relative to an observation time associated with the selected second direction packet.

* * * * *